(12) United States Patent
Dierkes et al.

(10) Patent No.: US 7,216,740 B2
(45) Date of Patent: May 15, 2007

(54) RAPPELLING RIG

(76) Inventors: Michael P. Dierkes, 3554 Yaeger Crossing Ct., St. Louis, MO (US) 63129; Derek L. Dunmire, 5610 Gumtree Ct., St. Louis, MO (US) 63129; Timothy H. Tanner, 646 Cleveland, Kirkwood, MO (US) 63122

( * ) Notice: Subject to any disclaimer, the term of this patent is extended or adjusted under 35 U.S.C. 154(b) by 298 days.

(21) Appl. No.: 10/867,129

(22) Filed: Jun. 14, 2004

(65) Prior Publication Data
US 2005/0039978 A1  Feb. 24, 2005

Related U.S. Application Data

(60) Provisional application No. 60/477,732, filed on Jun. 11, 2003.

(51) Int. Cl.
  *E06C 7/18*  (2006.01)
  *B64D 25/06*  (2006.01)
(52) U.S. Cl. ............................ 182/3; 182/9; 244/151 R
(58) Field of Classification Search ................... 182/3, 182/5, 6, 10, 36, 71, 72, 136, 141, 191–193, 182/236, 237, 239; 254/389–391; 104/115; 244/151 R, 137.2, 137.4, 118.1, 118.5, 4 A, 244/5; 224/240
  See application file for complete search history.

(56) References Cited

U.S. PATENT DOCUMENTS 2,979,028 A * 4/1961 Zakely .......................... 182/3
3,123,766 A * 3/1964 Ruddock et al. ............. 324/330
3,692,262 A * 9/1972 Gaylord .................. 244/151 A
3,904,155 A * 9/1975 Chavis .................... 244/118.1
4,378,921 A * 4/1983 Allen et al. ............. 244/151 R
5,069,400 A * 12/1991 Kovaletz ................. 244/118.1
5,277,348 A * 1/1994 Reid ....................... 244/151 R
6,302,859 B1 * 10/2001 Cushman ..................... 602/32
6,533,220 B2 * 3/2003 Schuster .................. 244/118.1

OTHER PUBLICATIONS

Interagency Helicopter Rappell Guide, Nov. 2001.
Tyler Technologies, Inc., Tyler Special Operations Platform, brochure, pp. 1-2, Van Nuys, CA, USA, undated.

* cited by examiner

*Primary Examiner*—Hugh B. Thompson, II
*Assistant Examiner*—Colleen M. Quinn
(74) *Attorney, Agent, or Firm*—Lewis, Rice & Fingersh, L.C.

(57) ABSTRACT

A rig for use in conjunction with a helicopter or other aircraft which allows the aircraft to be quickly converted to use as a platform for rappelling. The rig is preferably constructed of strapping materials into relatively planar main body portion with attached legs which connect to the struts supporting the helicopter's landing gear. The rig may also be bent and folded for compact storage without loss of structural integrity.

2 Claims, 7 Drawing Sheets

RAPPELLING RIG

CROSS REFERENCE TO RELATED APPLICATION(S)

This application claims priority to U.S. Provisional Application Ser. No. 60/477,732, filed Jun. 11, 2003, the entire disclosure of which is herein incorporated by reference.

BACKGROUND OF THE INVENTION (1) Field of the Invention

The present invention pertains to a rig used as a connection point for connecting rappelling or fast-roping ropes to a helicopter or similar vehicle.

(2) Background of the Invention

In modern society, there is a need for humans to be able to access locations from above. How this access is obtained depends on the nature of the target location and the surrounding terrain and structures. To get into remote, inaccessible, or high elevation locations where access from above is required, individuals often utilize the techniques of rappelling or fast-roping. These techniques essentially allow a user to utilize a rope and a friction device to descend from an overhead position into the location in a controlled manner. Essentially, the user descends from an elevated position to a lower position with the rope and friction device slowing or stopping the descent.

In order to rappel or fast rope, however, a rope is generally supported at the upper elevation and allowed to freely hang into the lower elevation under the force of gravity. The user then descends down the rope using the rope and associated equipment to generate sufficient friction to control the descent. In this way, so long as the user can get higher than the target location, they can access it from above.

While rappelling or fast roping may be performed from a natural or manmade structure down a slope or drop, this generally only allows access to a lower elevation from a higher elevation accessible by an alternative route. Rappelling and fast-roping are, however, particularly useful where the location is inaccessible by an overland or similar route, but is accessible from above by air. Therefore, the technique is often used from a helicopter or other hovering aircraft.

The need to rappel into a location arises in numerous different contexts. For instance, in search and rescue operations it is often necessary for rescue personnel to reach an area relatively inaccessible from the ground very quickly. For instance, an adventure seeker may be injured and require rapid medical intervention to avoid a permanent injury or death. If the adventure seeker is many days hike from roads or other locations, or has fallen in a location inaccessible from the ground (such as into a gully, or off a rock formation), personnel on foot may not be able to reach him/her in time to provide the needed medical intervention. However, an aircraft can often arrive over the adventure seeker's position significantly faster and rescue personnel can rappel down to the person to provide aid until overland help can arrive, or they can move the person toward approaching overland units to decrease the time before the adventure seeker is in the care of a hospital. In some situations, an overland route may be completely impossible. For instance, a ship lost in high seas can result in many survivors floating in the water. Because of the conditions which sank the original ship, it may be impossible for rescue personnel to approach the survivors by water. However, aid may be able to be rendered by personnel approaching from above by helicopter.

In other situations, military or police organizations need to drop personnel into potentially hostile areas so they can fight hostile forces, or attempt to arrest or contain criminals. In many of these situations (as also in many of the above situations) rappelling is a preferred method because the helicopter cannot land or it is unsafe for the helicopter to land. For instance, if the helicopter were to land on a building during a hostage situation, the hostage taker may attempt to commandeer the helicopter to make an escape. In other situations, the location simply does not permit the helicopter to land as the target location may be within dense forestation, rocks, or other objects or may be under fire. All of these conditions can prohibit the existence of a suitable landing site.

For all these reasons, rappelling has become one of the primary methods for getting personnel from a hovering helicopter to the ground safely. While rappelling may be a preferred method in many situations, most civilian helicopters and smaller helicopters have to do more than just carry rappelling individuals and are therefore not designed for rappelling maneuvers at all times. In search and rescue and other activities, the helicopter may be needed for many things other than just rappelling (such as rapid response of ground crews to a nearby area or transport of injured parties) and the inclusion of a rappelling rig in the helicopter at all times can necessarily take up space that would be better used for other things on some missions or can even completely prevent the use of the helicopter for other tasks. Further, as a helicopter generally has to have its doors removed for use in a rappelling situation, it is undesirable, and potentially dangerous, to prepare the helicopter for rappelling maneuvers unless they are known to be needed as personnel and gear can fall from the helicopter in flight when the doors are removed.

While rappelling is a great tool, it is also a hazardous activity. When rappelling, a person is suspended by rope high above the ground and the only items preventing them from falling are the strength of the rope, the knots, and the support to which the ropes are secured. Ropes and connectors used in rappelling are generally of highly modern materials and construction and are designed to support much more weight than necessary, even when damaged. However, where these ropes attach are often barely within weight requirements and are often not designed for the rappelling task. Many times the helicopter does not include preset hard points to allow for secure connection to the body of the helicopter and the rappeller is forced to attach at structures intended for another purpose entirely which may or may not be suitably secure. In use, multiple rappellers may also simultaneously rappel from multiple points also placing undo strain on the support, possibly with disastrous results.

SUMMARY OF THE INVENTION

Because of these and other problems in the art, it is desirable to have a rig which can be added or removed from a helicopter or other aircraft quickly, The rig, once installed, provides the ability for rappelling or fast-roping operations from the helicopter or other aircraft. It is also desirable that the rig be easily transportable for use when and where needed, and be designed to support multiple rappellers simultaneously without exceeding tolerances.

Described herein, in an embodiment is a rappelling rig comprising: a relatively planar main body portion comprising strapping materials; a plurality of legs attached to the main body portion, the legs comprising strapping materials; and at least one attachment point connected to the main body portion, the attachment point being suitable for the attachment of a rappelling rope; wherein, each of the plurality of legs is connected to a strut of the helicopter such that the main body portion is suspended within the helicopter in such a manner that a user can attach a rappelling rope to the attachment point and rappel from the helicopter.

In an embodiment of the rappelling rig, the strapping materials comprise strips of webbing, rope, cable, or chain. In another embodiment of the rappelling rig there is included at least one secondary attachment point which may be used by the user for rappelling or as a safety connection for a second user in the helicopter. There may also be at least one tertiary attachment point which may be used by the user for rappelling or as a safety connection for a second user in the helicopter.

In another embodiment of the rappelling rig, the main body portion is generally polygonal in shape, the polygon may be a quadrilateral or trapezoidal shape and the legs may attached to the main body portion at the corners of the quadrilateral or trapezoidal shape.

In another embodiment of the rappelling rig, each of the legs comprises a loop of the strapping materials which may have one end of the loop sewn to the main body and the other end of the loop is attached to the main body by a connector. The loop may also be covered by a protective covering which may be removably secured around the leg and the connector. The legs may be wrapped around the struts of the helicopter.

In another embodiment of the rappelling rig, a support may be included in the main body portion, the support comprising a beam or "X" constructed of strapping materials.

In a still further embodiment, there is described herein a method of preparing a helicopter for a rappelling operation, the method comprising the steps of: providing a helicopter; providing a rig, the rig comprising: a relatively planar main body portion comprising strapping materials; a plurality of legs attached to the main body portion, the legs comprising strapping materials; and at least one attachment point connected to the main body portion, the attachment point being suitable for the attachment of a rappelling rope; removing doors from the helicopter; laying the rig on the floor of the helicopter; wrapping the legs around struts of the helicopter so that each leg encircles a strut of the helicopter; adjusting the legs so as to support the main body portion under tension in the helicopter; attaching a rappelling rope to the attachment point; and allowing a rappeller to be connected to the rappelling rope.

In still another embodiment, there is described herein a rig for use in rappelling from a helicopter, the rig comprising: a main body portion; attachment means for allowing a rappelling rope to be attached to the main body portion; and leg means for attaching the main body portion to the helicopter, the leg means connecting to the struts of the helicopter; wherein, each of the leg means is connected to the struts of the helicopter so that the main body portion generally cannot move relative to the helicopter and a user can attach a rappelling rope to the attachment means and rappel from the helicopter.

In yet another embodiment of the rig, the main body portion and/or the legs are constructed of 1¾" Type 13U webbing.

DETAILED DESCRIPTION OF THE PREFERRED EMBODIMENTS

FIGS. 1 through 6 provide views of different embodiments of a rappelling rig (100) in accordance with the present invention. The embodiments are discussed simultaneously. The rappelling rig (100) is preferably constructed of materials having a high strength to weight ratio and which can be arranged to give the rig (100) a generally thin relatively planar construction. These materials will generally be relatively thin themselves and may comprise strips of material or rope-like structures. These materials will generally be referred to herein as "straps" or "strapping materials," and for the purposes of this disclosure, straps and strapping materials expressly includes, but is not limited to, leather or other animal hides, webbing materials, fabrics, ropes, chains, cables, bands, ligatures, wire, ribbons, sashes, plastics, or similar materials. In particular, the rig (100) is preferably constructed of strips of webbing (such as ballistic webbing), rope, strips of fabrics or other similar structures. In alternative embodiment, flexible metal structures such as cables or chains may be used. In the depicted embodiments, strips of climbing webbing are used. The webbing may be webbing rated for use in rappelling, and that is used elsewhere in rappelling activities, constructed into the rig (100), or may be specially constructed for the rig (100) out of any material. The rig (100) preferably is designed to support at least the weight of two persons without failure. In particular, the components of the depicted preferred embodiment are mostly constructed of 1¾" type 13U webbing two layers thick. The first layer forming an inner body and the other layer forming an outer body.

Figure 2:
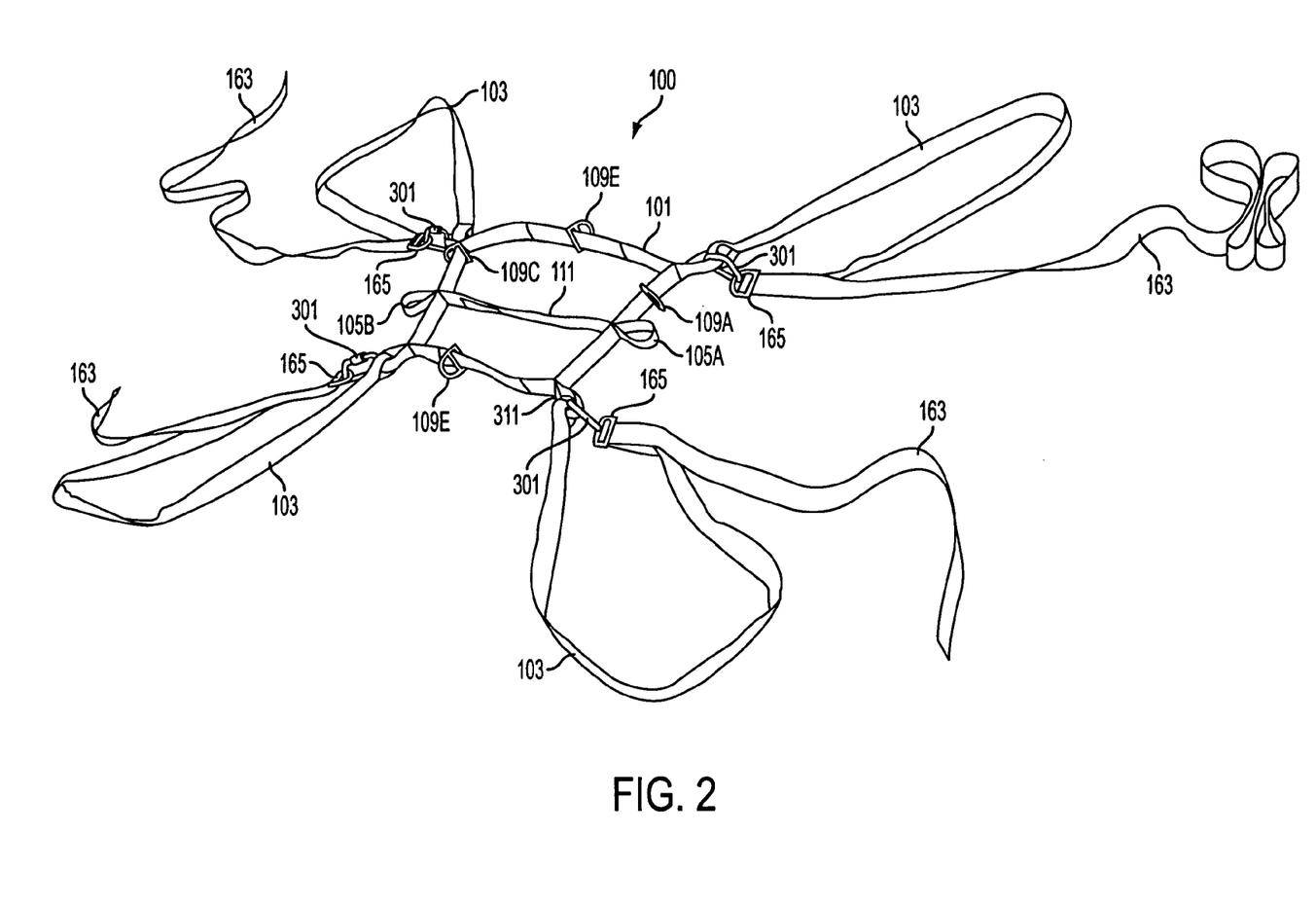
FIG. 2 shows the rig of FIG. 1 separated from the helicopter.
Figure 3:
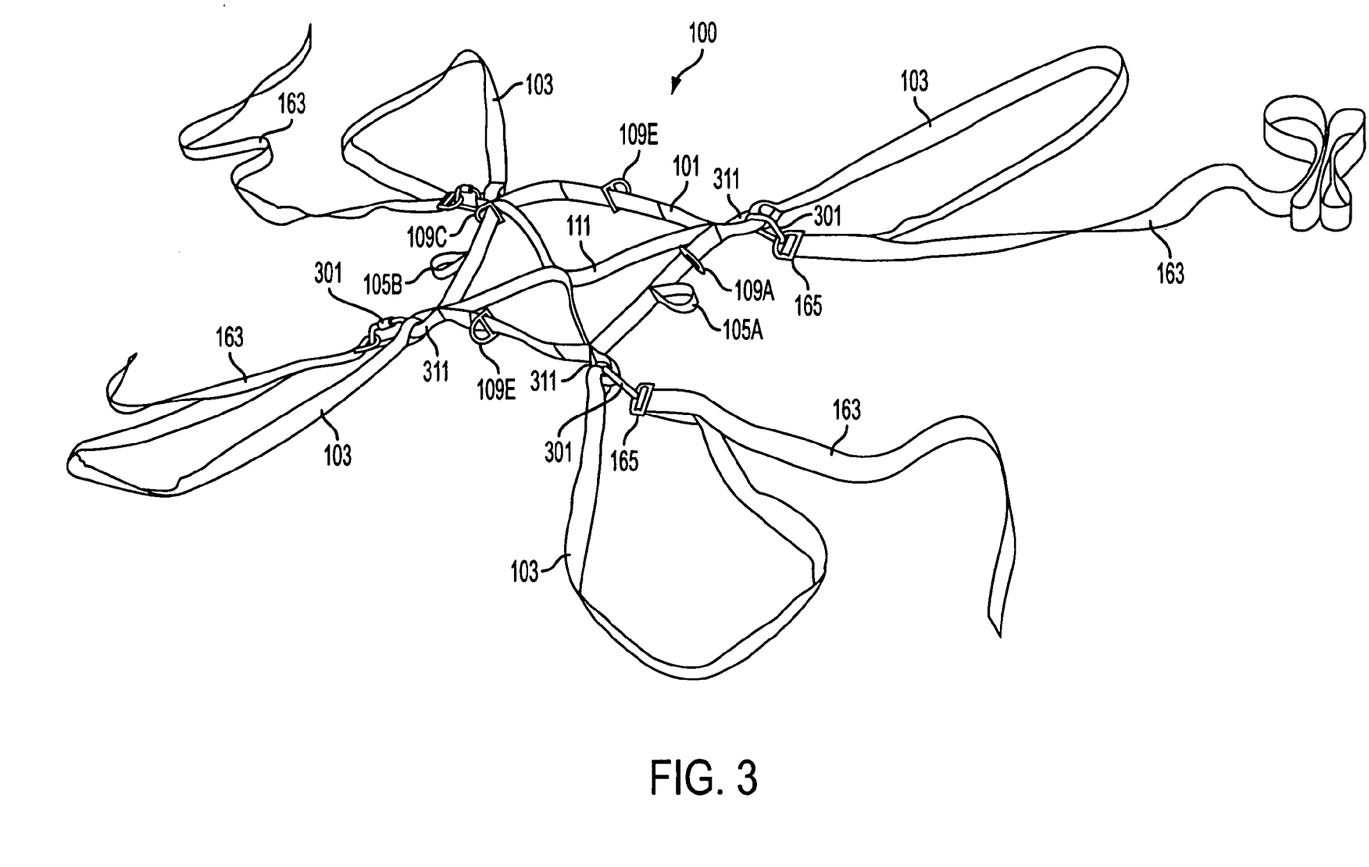
FIG. 3 shows another embodiment of a rig separated from a helicopter.

The rig (100) is preferably constructed by sewing or otherwise attaching pieces of the strapping materials into the shape of FIG. 2 or 3. As a connection is often the weak point; it is desirable for the construction to inhibit separation of components when placed under strain. In a preferred embodiment, the construction comprises sewing of 5 cord thread on a class 7 machine sewing a 3-point star pattern to achieve a desired level of strength.

As can be seen in the embodiments of FIGS. 2 through 3, It is preferred that the rig (100) generally comprise a main body section (101) with a plurality of legs (103) attached thereto. In the depicted embodiment, the main body section (101) is shown to be of a generally trapezoidal, or other quadrilateral, shape sewn so as to resolve into this shape when placed under tension. At each of multiple points on the main body portion (101) (in the embodiment of FIGS. 2 and 3 there are four points at the four corners), there is a ring of the strapping material making up the main body portion (101) to which is attached a leg (103), each leg (103) generally comprises a loop of webbing. The shape of the main body portion (101) will generally be determined by the number of legs (103) attached as well as considerations for the number of attachment points (105) included. In the depicted embodiment, a quadrilateral is logical as it allows one of four legs (103) to be attached one at each corner. While in the depicted embodiment the main body portion (101) is a generally quadrilateral shape, the main body portion (101) may be of any shape including, but not limited to, a circle, an ellipse, a polygon, or any other generally planar shape. Further, while the main body portion (101) is preferably a generally planar shape in arrangement so as to be relatively close to the level of the floor of the helicopter in use, this design is by no means required and in alternative embodiments, more 3-dimensional structures may be used in constructing main body portion (101) and/or legs (103).

Figure 4:
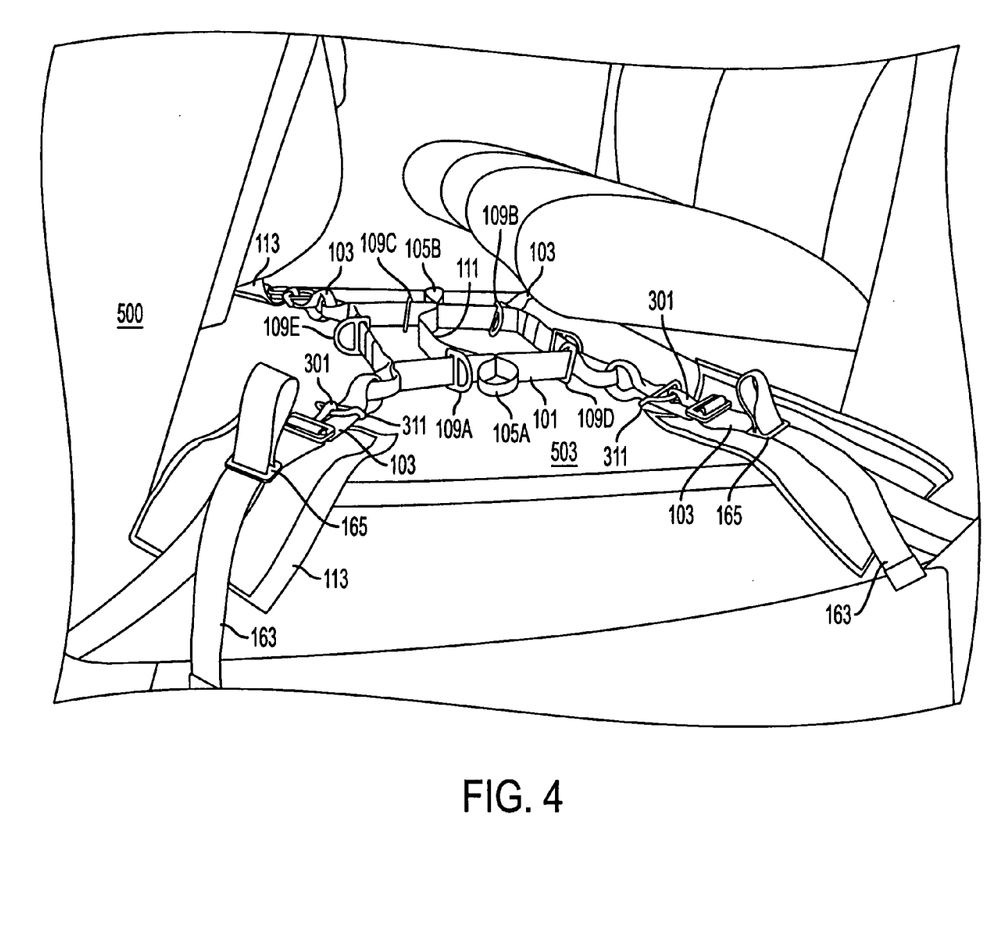
FIG. 4 provides a detailed view of an embodiment of a rig in the process of being mounted in a helicopter showing construction of a leg and protective covering.
Figure 6:
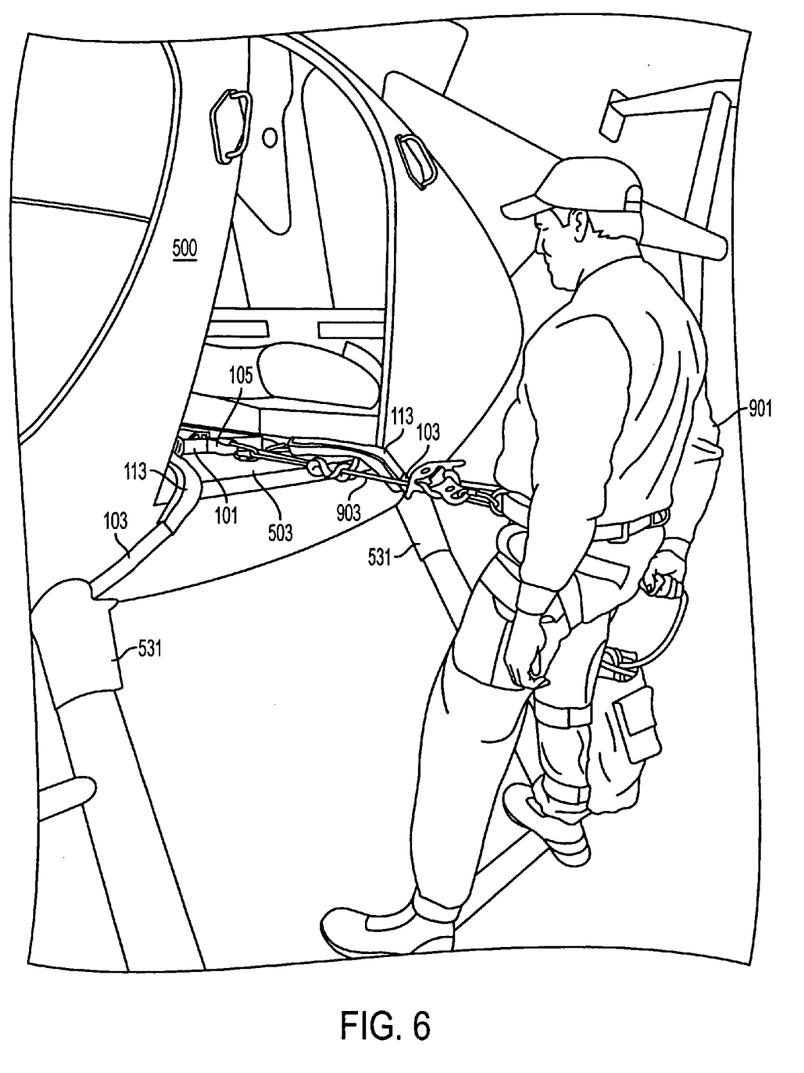
FIG. 6 provides for a rappeller ready to rappel from a helicopter using an embodiment of the rig.

The legs (103) are generally loops of strapping material designed to wrap around the landing gear, wheel or skid support struts (531) of the helicopter (500) to which the rig (100) is to be attached. In an alternative embodiment, the legs (103) may attach to other structures of the helicopter (500) such as the body, the skids, or the tail. This is shown in FIG. 6 where the legs (103) have been wrapped around the struts (531) of the helicopter (500) which connect the landing skids of the helicopter (500) to the body of the helicopter (500). Each of the legs (103) therefore preferably comprises an endless loop of strapping material including at least one connector (301) which can mate with a mating connector (311) on the main body portion (101). In the preferred embodiment, one end of the loop forming the leg (103) is non-removably attached, in normal operation, to the main body portion (101), such as by sewing as discussed above, while the other end is attached using the connector (301). The connector (301) is designed to allow the endless loop of the leg (103) to be opened so as to place the strut (531) there through, and then closed again to attach the loop around the strut (531). The loop is then reattached to the main body portion (101) by connecting the connector (301) with its mate (311) on the main body portion (101). The length of the loop of the leg (103) is preferably adjustable by pulling on the strap of the leg (103) to shorten the length of the leg (103) and tighten the connection. FIG. 6 provides for detail showing one of the legs (103) wrapped around the strut (531) of the helicopter (500) (and covered by a portion of the strut (531)). FIG. 4 shows how the tightening is accomplished. The leg (103) is tightened by pulling on the end portion (163) of the strap through the friction connector (165). Once tightened, the friction connector (165) pinches the strap of the leg (103) to not allow the leg (103) length making up the loop to increase. Such friction connectors (165) and methods are well known to those ordinary skill in the art. When all of the legs (103) have been placed and tightened about respective struts (531), the main body portion (101) is suspended tautly in the helicopter (500). It should be apparent that with proper tightening, the main body portion (101) is relatively centered on the floor (503) of the helicopter (500) and the combination of legs (103) provides force on the main body portion (101) to inhibit motion of the main body portion (101) in any direction relative to the helicopter (500). Each leg (103) may be of adjustable size, shape, or construction to accommodate attachment in multiple different helicopters (500), or may be sized and shaped for use with a particular type of helicopter (500).

Further, the number of legs (103) used on present on the rig (100) may depend on the number of attachment points used on the particular helicopter (500) and the arrangement of those points. Generally, it will be desirable to securely suspend the main body portion (101) via the legs (103) via at least three points so that a force from any direction on the main body portion (101) will be resisted by an appropriate force from a leg (103) to prevent the main body portion (101) from engaging in any significant movement in any direction when a force is applied to it from the rappelling action. It is preferable that the attachment be arranged so that there is no significant movement regardless of how many rappellers are using the rig (100) at any given time, but that is not required in alternative embodiments. In a preferred embodiment, the legs (103) are arranged to extend from the main body portion (101) at relatively equal angles from each other when the rig (100) is in place to provide for taunt suspension in all directions. In this way, it is generally impossible for force in a particular direction applied to the rig (100) to shift the rig (100) in any particular direction any significant amount. In a preferred embodiment, as depicted, four legs (103) are used to connect to the four struts (531) of the helicopter (500). The main body portion (101) when placed under strain because it supports a rappeller may, of course, bend, flex, stretch or otherwise adjust to accommodate the weight of the rappeller. Such adjustment of strapping material being understood to one of ordinary skill in the art.

Figure 5:
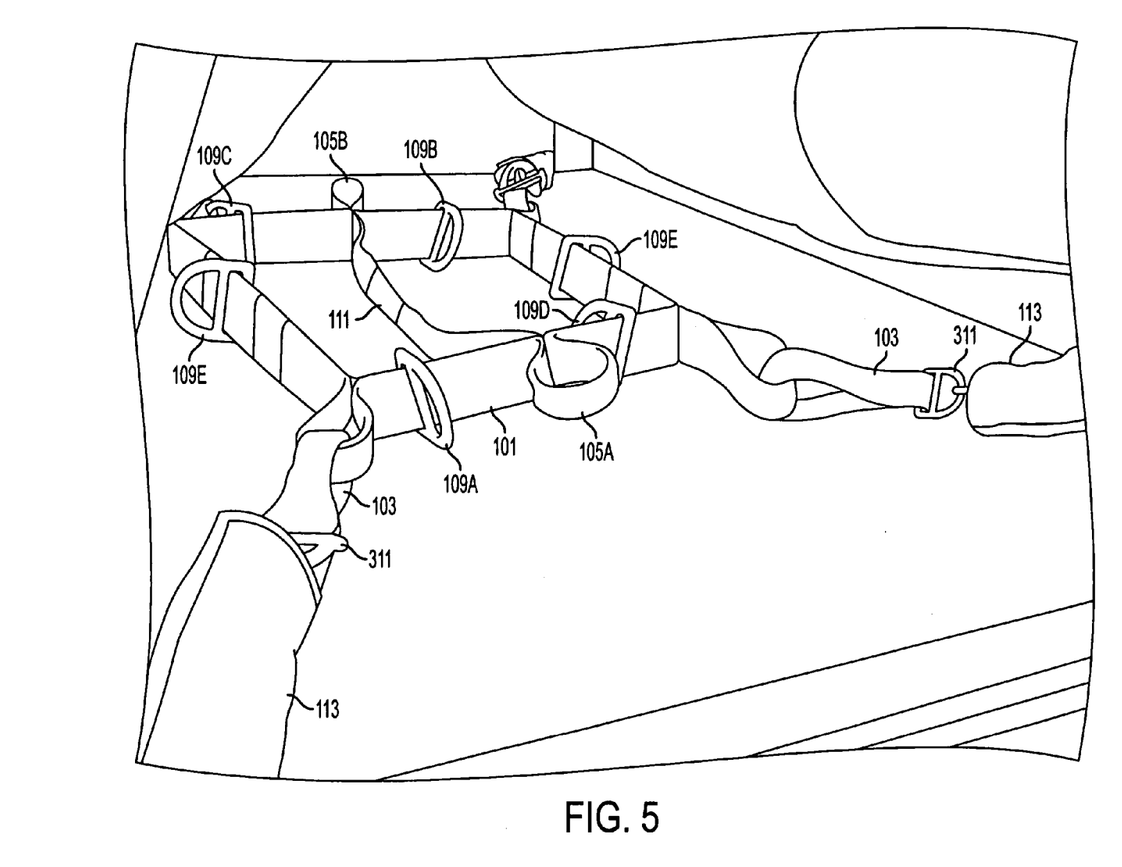
FIG. 5 provides a detailed view of the embodiment of FIG. 4 showing the attachment points in more detail.

The main body portion (101) of the rig (100) preferably includes multiple attachment points (105) which comprise points at which to attach ropes for rappelling or fast roping, such mechanisms for attachment being understood by those of ordinary skill in the art. FIG. 5 provides for a detail view showing two primary attachment points (105) which comprise loops of the strapping material of the main body portion (101) in the depicted embodiment. The rappeller will attach their ropes (or a group rope depending on the methods being used) to a particular attachment point (105), and rappel while the rope is secured to the helicopter (500) by the rig (100). In the preferred embodiment, the rig (100) has sufficient attachment points (105) so that at least two persons can rappel simultaneously from the rig (100), generally one out each side of the helicopter (500), although the rig (100) may be designed to allow any number of simultaneous or related rappelling activities.

In a preferred embodiment, the main body (101) also includes additional attachment points (109) which are generally not used as the primary attachment for ropes in rappelling operations but are instead used as safety contacts for personnel not currently rappelling to attach to the rig (100) or for secondary or tertiary connections in the rappelling operation. Alternatively, additional attachment points (109) may be used for additional rappelling. In the depicted embodiment of FIG. 5, a rappeller using primary attachment point (105A), would generally use attachment point (109A) as a secondary attachment (such as for a brake rope), and could use attachment point (109B) as their tertiary attachment point. Attachment points (109C) and (109D) would correspond to (109A) and (109B) for a primary attachment point of (105B). Attachment points (109E) would then generally be for use by other personnel as safety connections.

During rappelling operations, the doors of the helicopter (500) which is being repelled from are usually opened or more generally removed. If the helicopter (500) is forced to make sudden movements during the rappelling operation, personnel waiting to rappel or otherwise present in the helicopter (500) (for instance safety personnel or operators) who may be standing or otherwise unable to be belted to the helicopter (500) may be flung out the open doors. The inclusion of additional attachment points (109) can allow them to utilize safety cables attaching them to the rig (100)

to prevent falls from the helicopter (500) and allow them to be pulled back into the helicopter (500) by other personnel, or safely lowered to the ground. Further, because the safety cables are attached to the rig (100), personnel can generally work with the rig (100) as their jobs might require without the safety cables constraining their movement.

As depicted in FIGS. 2 through 3, the main body portion (101) may include one or more reinforcing structures (111) which may be a part of the main body portion (101) or may be attached to the main body portion (101). These reinforcing structures (111), which in the depicted embodiment comprise strips of 1¾" Type 7 webbing arranged in the form of a beam or an "X" in the center of the main body portion (101), depending on the embodiment, generally provide for additional strength to the rig (100). The reinforcing structures (111) may be of any type or shape known to those of ordinary skill in the art to reinforce the rig (100) and provide it with increased break resistance. In the depicted embodiment, the rig (100) is preferably rated to support at least two simultaneous rappellers preferably being able to support at least a 1,000 pound load before any failure. The beam construction is preferable in a two rappeller situation as the beam can be arranged between the two attachment points (105) as shown in FIG. 2. This arrangement uses the weight of the two rappellers directly to counter-balance each other by allowing for a transfer of force between primary attachment point (105A) and (105B) and vice-versa.

In the depicted embodiment, the rig (100), as shown best in FIGS. 4 and 5, also includes a protective covering (113) which may make various components of the rig (100) easier to see (such as by being brightly colored) or may provide orientation information in addition to protecting the legs (103) and/or main body portion (101) from wear or damage as well as protecting the helicopter (500) from damage from the rig (100). In particular, many components of the rig (100) will move relative to the helicopter (500) or relative to each other during installation and may flex or push against the structure in operation. For instance, the legs (103) may pull, stretch, or rub, against various portions of the helicopter (500) body and the rig (100) may be abraded by moving personnel or equipment inside the helicopter (500). As the protective covering (113) preferably surrounds the rig (100) at points of likely damage, and will comprise fabric or similar materials, the protective covering (113) may avoid these damaging actions. However, the protective covering (113) preferably does not provide for structural strength of the rig (100) and therefore, if damaged, does not compromise the strength of the rig (100). As shown in the depicted embodiment, the protective covering (113) may be removably secured around the leg (103) and/or connector (301) such as by being able to be separated from itself at a connection point held together with hook and loop faster (Velcro™), or other types of fastener. The protective covering (113) may be constructed of any type of material but in a preferred embodiment comprises orange or yellow Spundura® fiber.

Further, protective coverings may be used to cover mechanical components of the rig (100) to protect them from damage or from unintended activation. In particular, the covering (113) as shown in FIG. 5 may be placed over the connection from the leg (103) to the main body portion (101) to prevent the connector (301) from becoming snagged or being hit by an object which could result in the opening of the connector (301).

In a preferred embodiment, the rig (100) is intended for rapid deployment to allow a helicopter which is not always used for rappelling to be converted into a platform for rappelling very quickly. This is particularly useful in search and rescue operations where a search and rescue crew needs to respond to a distress call and be ready to perform a rappelling operation quickly and may need to use a helicopter used for other purposes (such as police operations) or commandeered at the time and place of rescue. Because of the rig's (100) shape and construction materials being constructed from small strong connectors and strapping materials, it can generally be compacted into a relatively small space when not in use. In particular, it may be transported in a small duffel bag or other carrying case when not in use as the strapping materials can usually be bent, folded, or crushed without causing structural damage to them. This can allow the rig (100) to be maintained either near or within the helicopter or easily transported by an individual human being to a helicopter.

Figure 1:
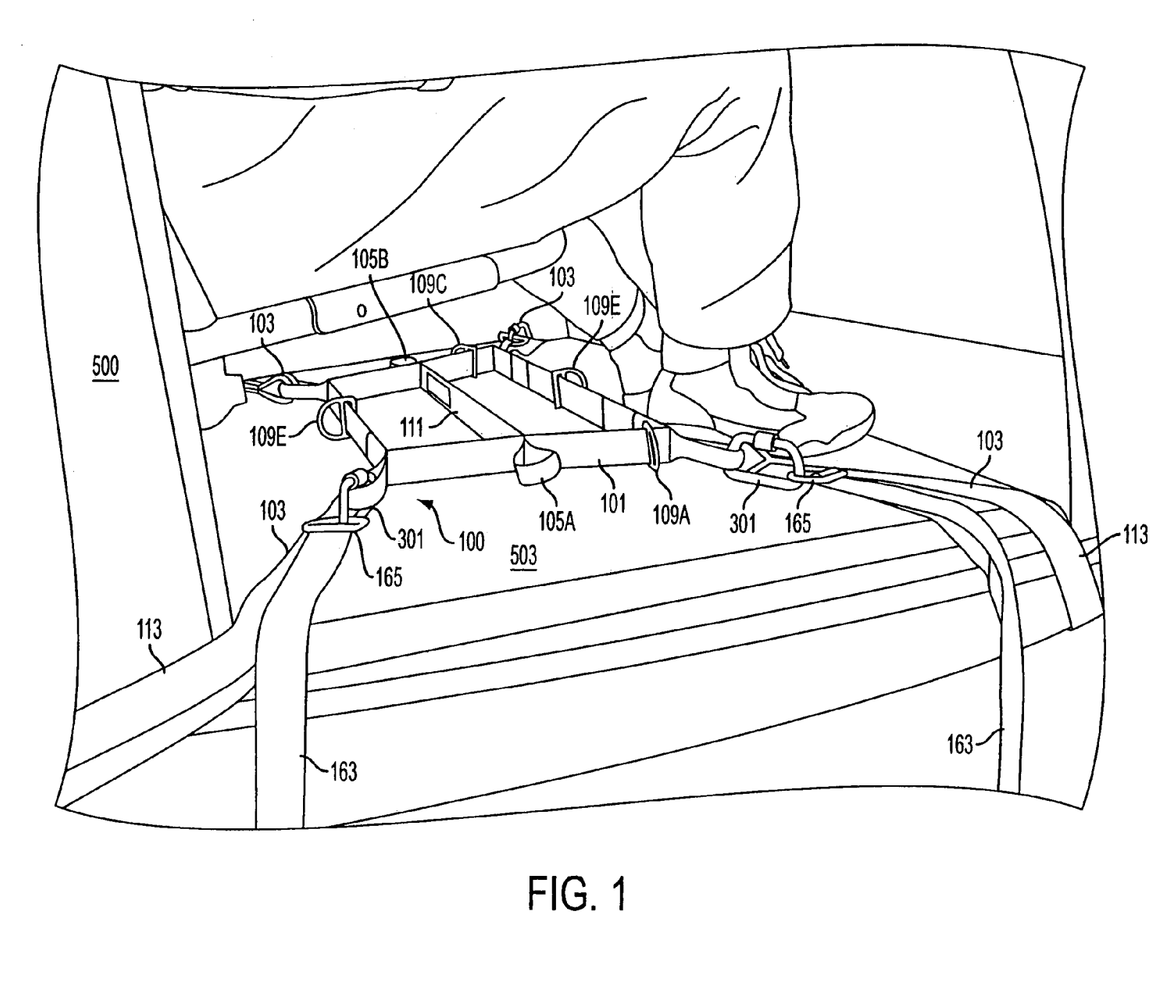
FIG. 1 shows an embodiment of a rappelling rig in place in a helicopter and ready to use.
Figure 7:
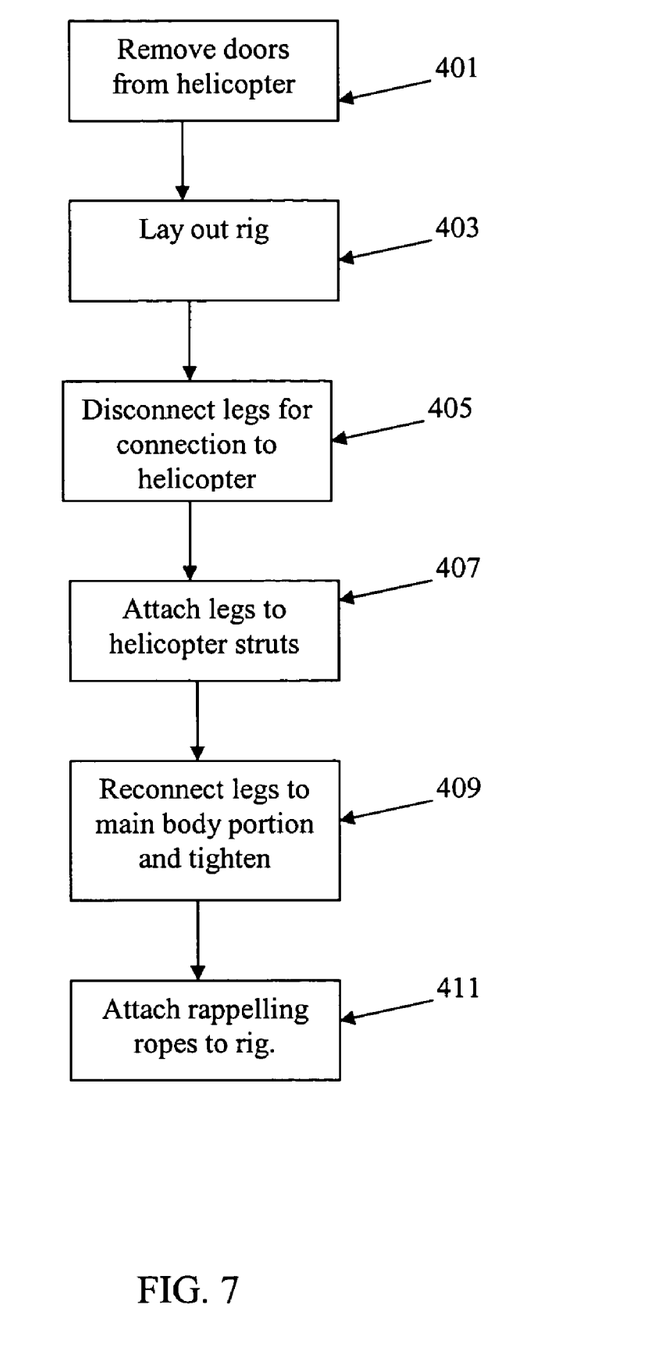
FIG. 7 provides a flowchart of the steps for installing an embodiment of a rig into a helicopter.

FIG. 1 shows an embodiment of the rig (100) attached to a helicopter (500) as it might be when ready for use. The main body portion (101) is placed within the helicopter (500) on or near the floor (503) of the helicopter (500). The doors of the helicopter (500) are removed. The legs (103) are then extended from the main body portion (101) and each leg (103) is attached securely to a strut (501) of the helicopter (500) suspending the main body portion (101) of the rig within the body of the helicopter (500) once installed. The two attachment points (105) are accessible for rappelling out of the doors on either side of the helicopter (500) and the rig (101) is ready for use. FIG. 6 provides for a rappeller (901) connected with rappelling ropes (903) to the rig of FIG. 1 and ready to rappel. This may be a transport position to the point of rappelling and also the staging arrangement prior to rappelling. Generally there will be a rappeller (901) in this orientation on both sides of the helicopter (500) simultaneously to provide for an even distribution of weight as they rappel FIG. 7 provides for a flowchart of the steps used to attach the rig (100) to the helicopter (500). In step (401) the doors are removed from the helicopter (500) or are opened and secured in position. In step (403), The rig (100) is generally laid out on the floor of the helicopter (500) in the general position in which it will be placed. In step (405), the coverings (113) are opened and the leg connectors (301) are disconnected from the mating connectors (311) on the main body section (101). In step (407), the legs (103) are placed so as to encircle the strut (531) of the helicopter (500). In step (409), the leg connector (301) is reconnected to the main body section (101) mating connector (311) and the length of the leg (103) loop is reduced to tighten the connection and to support the rig (101) in a relatively rigid position. At this time the rig (101) is installed as in FIG. 1. Prior to rappelling, a rappelling rope or ropes will be attached at step (411) to a connection point (105) of the rig (100), and a rappeller will attach themselves to the rope(s) as is understood by one of ordinary skill in the art such as is shown in FIG. 6.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A rig for use in rappelling from a helicopter, the rig comprising:
    a main body portion;

attachment means for allowing a rappelling rope to be attached to said main body portion; and leg means for attaching said main body portion to a helicopter;

wherein, said leg means are adapted to connect to a strut of said helicopter so that said main body portion generally cannot move relative to said helicopter and serves as an anchor for a rappelling rope attached to said attachment means and used by a user to rappel from said helicopter, said rig remaining on said helicopter during said rappelling; and wherein said main body portion is constructed of 1¾" webbing.

2. The rig of claim 1 wherein said leg means comprise loops of 1¾" webbing.

* * * * *